(12) United States Patent
Kynast et al.

(10) Patent No.: US 7,343,437 B2
(45) Date of Patent: Mar. 11, 2008

(54) SYNCHRONIZATION METHOD AND CONTROL SYSTEM FOR THE TIME SYNCHRONIZATION OF SLAVE UNITS AND A SYNCHRONIZABLE SLAVE UNIT

(75) Inventors: Rigobert Kynast, Lohr-Wombach (DE); Bernard Schneider, Assens (CH)

(73) Assignee: Bosch Rexroth AG, Stuttgart (DE)

( * ) Notice: Subject to any disclaimer, the term of this patent is extended or adjusted under 35 U.S.C. 154(b) by 194 days.

(21) Appl. No.: 11/282,167

(22) Filed: Nov. 18, 2005

(65) Prior Publication Data

US 2006/0129864 A1 Jun. 15, 2006

(51) Int. Cl.
*G06F 13/00* (2006.01)
*G06F 1/12* (2006.01)
(52) U.S. Cl. ...................... 710/110; 713/400
(58) Field of Classification Search ............ 710/61, 710/110; 713/400, 401, 502, 503
See application file for complete search history.

(56) References Cited

U.S. PATENT DOCUMENTS 7,035,269 B2 * 4/2006 Rolston et al. ............ 370/400
7,143,301 B2 * 11/2006 Pearce et al. ............. 713/401
7,240,231 B2 * 7/2007 Conway .................... 713/401
2002/0110155 A1 8/2002 Pearce et al.
2006/0114943 A1 * 6/2006 Kynast et al. ............. 370/509

FOREIGN PATENT DOCUMENTS

DE 199 17 354 A1 10/2000
JP 61006954 A 1/1986

OTHER PUBLICATIONS

Full Translation of DE 19917354, Oct. 19, 2000, Germany.*

* cited by examiner

*Primary Examiner*—Khanh Dang
(74) *Attorney, Agent, or Firm*—Kenyon & Kenyon LLP

(57) ABSTRACT

A synchronization method, a control system and a slave unit for the time synchronization of at least two slave units, in which the slave units and the master unit are connected by two signal lines. A signal transmitted by the master unit returns to the master unit after passing through all the slave units. Two independent counters are provided in each slave unit, these counters being activated by reception of a reference signal transmitted by the master unit. The first time counter counts the time since the receipt of the reference signal via the first signal line and the second time counter counts the time since the receipt of the reference signal via the second signal line. The counter contents are read out as soon as the sum of the counter contents reaches a signal throughput time transmitted previously by the master unit.

26 Claims, 5 Drawing Sheets

SYNCHRONIZATION METHOD AND CONTROL SYSTEM FOR THE TIME SYNCHRONIZATION OF SLAVE UNITS AND A SYNCHRONIZABLE SLAVE UNIT

RELATED APPLICATION INFORMATION

The present application is based on priority German patent application no. DE 10 2004 055 975.9, which was filed in the German patent office on Nov. 19, 2004, and the entire contents of which are hereby incorporated by reference.

FIELD OF THE INVENTION

The present invention relates to a method and a control system for the time synchronization of multiple slave units which are controlled by a master unit via a communication system. In particular, the exemplary embodiment and/or exemplary method of the present invention relates to a method and a control system that outputs synchronization signals to multiple slave units in a synchronized manner. Finally, the exemplary embodiment and/or exemplary method of the present invention relates to a synchronizable slave unit.

BACKGROUND INFORMATION

To control industrial processes and systems, e.g., offset printing machines and machine tools, it is often necessary to control, i.e., drive, a plurality of individual systems in synchronization. In a printing system, for example, the axes of individual printing stations must be controlled very precisely over time to ensure satisfactory printing of the print product. In the case of a machine tool, individual axes must be triggerable in a mutually coordinated manner with high time precision.

Control of such a complex industrial system is usually implemented by a decentralized distributed control system. In this way, through the use of modular electronic controls, a plurality of different control systems may be composed of a few basic components. Modular control and regulating circuits are typically used for individual components of the system. These control and regulating circuits are interconnected via a field bus which permits mutual data exchange and connection to a control console.

To ensure a precise interaction of the individual system components over time, a common time base must be supplied in all control and regulating circuits. Only in this way is it possible to ensure the required coordination among the individual decentralized control circuits.

It is customary in printing machine control to supply synchronization signals corresponding to a virtual axis signal to individual drives, for example. By analogy with a mechanical drive, a main control unit generates a signal corresponding to a virtual longitudinal wave. Slave units generate a virtual standing wave signal starting from each longitudinal wave signal.

DE-A-199 17 354 describes a synchronization method for synchronizing a master unit with slave units. The master unit and the slave units each have their own timers. The timers of the slave units are synchronized with the timer of the master unit at regular intervals to minimize deviations between the timers. To do so, the master unit transmits signals containing the transmission time to a slave unit over two ring-shaped communication paths. These time signals require different transit times to the slave unit. The slave unit measures the difference between the signal transit times and receives from the master unit a cycle time for the signal throughput through the ring-shaped communication paths. The slave unit calculates from this the transit time of the time signals from the master unit over the particular communication path. The time information sent by the master unit is corrected using the calculated transit time to determine the expected reception time. The timer of the slave unit may be corrected based on the comparison of the expected reception time with the reception time measured by the slave unit.

One disadvantage of this traditional method is that after ascertaining the transit time difference, each slave unit must calculate the individual signal transit time of the individual communication paths. In addition, each slave unit must also determine which signal path the time signal arrives on first to ensure a correct calculation of the transit times. Furthermore, the method proposed in the publication in question is based on each slave unit and the master unit having individual timers. Because of the limited accuracy of such timers, a deviation among the individual timers may develop within a short period of time and may be substantial in comparison with the required timing precision. Therefore, despite the use of individual timers, the individual units must be resynchronized frequently.

The IEEE1588 standard entitled "Precision Clock Synchronization Protocol for Networked Measurement and Control Systems" (abbreviated PTP) is often used for cyclic synchronization of individual timers. This standard defines a method for synchronizing multiple real time clocks distributed in space and connected via a network such as Ethernet. According to PTP, one station is established as the master clock and sends the other stations a first sync telegram and then a follow-up telegram specifying the exact point in time of the first telegram. The receiving station is able to calculate the time difference between its clock and the master clock on the basis of the first telegram, the follow-up telegram and its own clock and thereby perform a clock synchronization.

A machine control system is described in US 2002/0110155. This machine controller has a central control unit and a plurality of secondary nodes, each controlling one actuator. Each node stores a delay parameter for signals from the central control unit. The particular delay parameter depends on the signal transit time between the central control unit and the node. The central control unit sends time messages which trigger a synchronized implementation of control commands in the nodes in cooperation with the delay parameters. To determine the signal transit time from the central control unit to each node, the control unit sends a data telegram to each node which then sends it back. The central control unit calculates the transit time delay of the signal up to the node from the period of time until the signal returns and sends this information to the node.

One disadvantage of this method is that it requires an extensive initialization phase during which the central control unit determines the signal transit time to each node and sends this information to the individual nodes.

SUMMARY OF THE INVENTION

An object of the exemplary embodiment and/or exemplary method of the present invention is to provide an improved time synchronization of control units so that a common time system is available in different spatially separated control units in the simplest and most efficient way possible.

This object may be achieved according to the exemplary embodiment and/or exemplary method of the present invention through the features described herein for a synchronization method, through the features described herein for a control system, and through the features described herein for a slave unit.

In addition, advantageous embodiments of the present invention are also described herein.

According to a first aspect of the exemplary embodiment and/or exemplary method of the present invention, a synchronization method for the time synchronization of at least two slave units is provided. The slave units are controlled by a master unit, two signal lines being provided, passing through each slave unit exactly once in opposite directions. Furthermore, the signal lines are configured so that a signal sent by the master unit passes through all slave units on at least one of the signal lines and returns to the master unit. This method includes the steps of ascertaining the signal transit time needed for a signal sent by the master unit to return and reporting the signal transit time to all slave units. Furthermore, the master unit sends at least one control signal to all slave units as a reference signal, so that each slave unit receives the at least one control signal over both signal lines. Each slave unit performs the following steps. A first time count is started on receipt of the at least one control signal via the first signal line and a second time count is performed on receipt of the at least one control signal via the second signal line. The two time counter contents are added and compared with the reported signal throughput time. The time counter contents are read out as soon as the added time counter contents correspond to the reported signal throughput time. For each slave unit, a time correction parameter with respect to each signal line is ascertained on the basis of the time counter contents read out. The slave units are self-synchronizing, taking into account the time correction parameters.

According to a second aspect of the exemplary embodiment and/or exemplary method of the present invention, a control system as described herein is provided.

According to a third aspect of the exemplary embodiment and/or exemplary method of the present invention, a time-synchronizable slave unit is provided. The second unit is in turn controlled by a master unit and has two signal lines running through it. The slave unit receives a signal throughput time reported by the master unit. In addition, the slave unit receives a reference signal via both signal lines, this signal having been sent by the master unit to the slave unit in the form of at least one control signal. The slave unit is equipped with a first time counter, which counts a first time since the receipt of the reference signal over the first signal line, and the second time counter, which counts a second time since receipt of the reference signal via the second signal line. Furthermore, the slave unit has a control unit having an adder for adding the two time counter contents, a comparator for comparing the added time counter contents with the reported signal throughput time and a device for reading out the time counter contents as soon as the added time counter contents correspond to the reported signal throughput time. For each signal line, a time correction parameter is ascertained on the basis of at least one of the counter contents read out. This slave unit performs a synchronization, taking into account the time correction parameters.

The exemplary embodiment and/or exemplary method of the present invention is characterized in that in each slave unit, two time counts are performed, which may be done by two time counters. For simplicity of wording, time counters will be mentioned mostly below. The time counts are activated by receipt of a reference signal from the master unit. The first time count determines the time since receipt of the reference signal over the first signal line. The counter contents are read out as soon as the sum of the counter contents has reached the previously reported signal transit time.

In an advantageous manner, the exemplary embodiment and/or exemplary method of the present invention thus describes a simple and automatic ascertainment of absolute measured time values, each being assigned to one signal line in a defined manner. The procedure of ascertaining individual measured time values assigned to the signal lines permits practically automatic and direct acceptance of measured time values as correction parameters of a synchronization.

Another advantage of the exemplary embodiment and/or exemplary method of the present invention is the efficient ascertainment of these measured time values by a calculation performed largely in parallel. In particular, two individual measured time values for the signal lines are generated simultaneously in each slave unit. Furthermore, all the slave units may advantageously perform the ascertainment of the measured time values in parallel and independently of one another. An inherent redundancy and the parallel structure of a decentralized control system are optimally utilized in this way. In addition, measured time values are available simultaneously in all slave units and may be used immediately for synchronization.

An additional advantage which may be mentioned is the fact that determination of the measured time values causes only a very low data transfer volume between the master unit and the slave units. In particular, determination of measured time values is triggered by at most one reference signal per signal line. No further data exchange is necessary to perform the determination. The signal throughput time may be reported once in advance by the master unit and then need be updated only when there is a change in the system topology.

In contrast with traditional methods in which a time difference between the arrival of two time signals is determined, a knowledge or ascertainment of such a time difference is not necessary at any time according to the exemplary embodiment and/or exemplary method of the present invention. Such traditional methods also include additional computation steps that require additional measured values following the ascertainment of the time difference, namely the information regarding which portion of the signal line first receives a time signal and the value of the signal cycle time in the entire system. However, according to the exemplary embodiment and/or exemplary method of the present invention, the measured time values thus ascertained may be used for synchronization without taking into account any other parameters.

Determination of time correction parameters according to the exemplary embodiment and/or exemplary method of the exemplary embodiment and/or exemplary method of the present invention is suitable for initializing the control system and for a continuous and/or sporadic or regularly performed reconfiguration, i.e., time tuning.

According to another aspect of the exemplary embodiment and/or exemplary method of the present invention, a synchronization method as described herein is provided. Accordingly, the slave units determine the point in time when the added time counter contents correspond to the reported signal transit time and are synchronized on the basis of the point in time thus ascertained. For example, a subsequent determination of time correction parameters is not absolutely necessary to perform synchronization of the slave units. Thus a very efficient automated method for synchronization is provided in an advantageous manner. The point in time thus ascertained may correspond to an identical point in time for all slave units, so that a common time base is defined.

The master unit may send the slave units a control signal that functions as a triggering signal for generating the synchronization signals. The synchronized output of synchronization signals is controlled centrally in an efficient manner in this way.

According to one embodiment of the present invention, the time correction parameter assigned by the slave unit to one of the signal lines corresponds to an individual waiting time, and on receipt of a triggering signal via this signal line, the slave unit outputs the synchronization signal after the waiting time has elapsed. A particularly simple but very accurate arrangement to generate synchronized synchronization signals in the slave units is implementable in this way. In contrast with the related art, however, it is not necessary to calibrate the internal clocks of all the slave units with one another.

In particular after receipt of a control signal and after the waiting time has elapsed, a point in time occurring simultaneously for all slave units may be established. Therefore, a common time base is provided in all slave units in a simple manner. Synchronous control functions having high time precision may be performed on the basis of this time base.

Each slave unit may determine a time correction parameter for each signal line. The time correction parameters are thus determined directly by each slave unit itself. Alternatively, however, the time correction parameters for each slave unit may also be determined by the master unit. To do so, it may be necessary for the master unit to query the time counter contents read out by the particular slave unit.

In one embodiment according to the present invention, the two signal lines are configured in such a way that slave units are linked together serially starting from the master unit, and the last slave unit from the standpoint of the master unit transmits signals from the one signal line to the other signal line. Such a configuration of signal lines allows automatic determination of time correction parameters in the connected slave units, so that synchronized output of synchronization signals is ensured in an efficient manner without manual configuration at the time of installation of the system. This topology is recommended for applications in which there are very long signal paths between the stations and which do not enter a safety-critical state in the event of failure of the signal transmission.

According to another embodiment, the two signal lines each form two ring-shaped signal paths leading away from the master unit and returning back to it. This topology also permits automatic ascertainment of the time correction parameters in the connected slave units, thereby efficiently ensuring high time precision in the synchronization signals output by the slave units. Furthermore, this topology is suitable for safety-relevant control tasks because there is redundancy in signal transmission due to the two independent signal paths.

The master unit may determine the signal transit time for each ring-shaped signal path. First, this makes it possible to detect any asymmetry in the signal paths, generating a user message accordingly, or a corresponding configuration of the slave units may be performed, if necessary. In addition, failure of a signal path may be detected and signaled to the user.

If the topology described above having two ring-shaped signal paths is used, it is expedient for the master unit to send a control signal on each of the two signal paths simultaneously. This simplifies the ascertainment of the time correction parameters in the slave units because no transmission skew need be taken into account for the calculation. In principle, however, the calculation may also be performed by taking into account a known skew.

The signal throughput time of the ring-shaped signal paths may always the same.

When using the linear topology described above, the signal transit time from the master unit to the last slave unit on the one signal line may be equal to the signal transit time from the last slave unit to the master unit on the other signal line.

With the two above-mentioned topologies, a particularly simple interpretation of the time counter contents which have been read out and consequently a simple ascertainment of the time correction parameters are obtained in such a symmetrical arrangement of slave units and signal lines.

The time correction parameter determined by the slave unit for one signal line may be equal to a measure of the signal transit time from the master unit to the slave unit on the other signal line.

According to another advantageous embodiment, each slave unit stores the read-out contents of the first time counter as a time correction parameter for the first signal line and the read-out contents of the second time counter as a time correction parameter for the second signal line.

The synchronization signals may be output simultaneously with the return of the triggering signal to the master unit. The master unit thus receives an acknowledgment reporting the point in time of output of the synchronization signals. In the same way, the return of a control signal to the master unit may correspond to a point in time which is ascertained identically for each slave unit.

According to another embodiment, the signal throughput time of the ring-shaped signal paths may also be different. Therefore, the automatic calibration of the slave units according to the exemplary embodiment and/or exemplary method of the present invention may also be used for topologies having an asymmetrical design with regard to the signal lines.

In such a case, the synchronization signals may be output simultaneously with the return of the triggering signal that requires the longer signal throughput time for return to the master unit. This ensures that all slave units are triggered promptly to generate and output synchronized synchronization signals. The return of a control signal on the longer signal line may in the same way correspond to a point in time which is determined identically for each slave unit.

According to another embodiment, the master unit reports a signal throughput time which is greater than the determined signal throughput time. This makes it possible to take into account additional signal processing time in the slave units. Furthermore, such a time buffer is advantageous in any subsequent expansion of the system.

The signal throughput time reported may be equal to a signal throughput time obtained by the additional insertion of a predefined number of slave units into the signal paths. In this way, insertion of additional slave units may be taken into account in advance. Furthermore, slave units may be inserted into the control system even subsequently during ongoing operation without resulting in a change in the time sequence of generating synchronization signals.

According to the exemplary embodiment and/or exemplary method of the present invention, the time counter contents may be added up and the added time counter contents are compared continuously with the reported signal throughput time. Therefore, parameters, i.e., the time counter contents which permit synchronized decentralized generation of the synchronization signals, are available immediately after read-out of the time counter contents.

DETAILED DESCRIPTION

Figure 1:
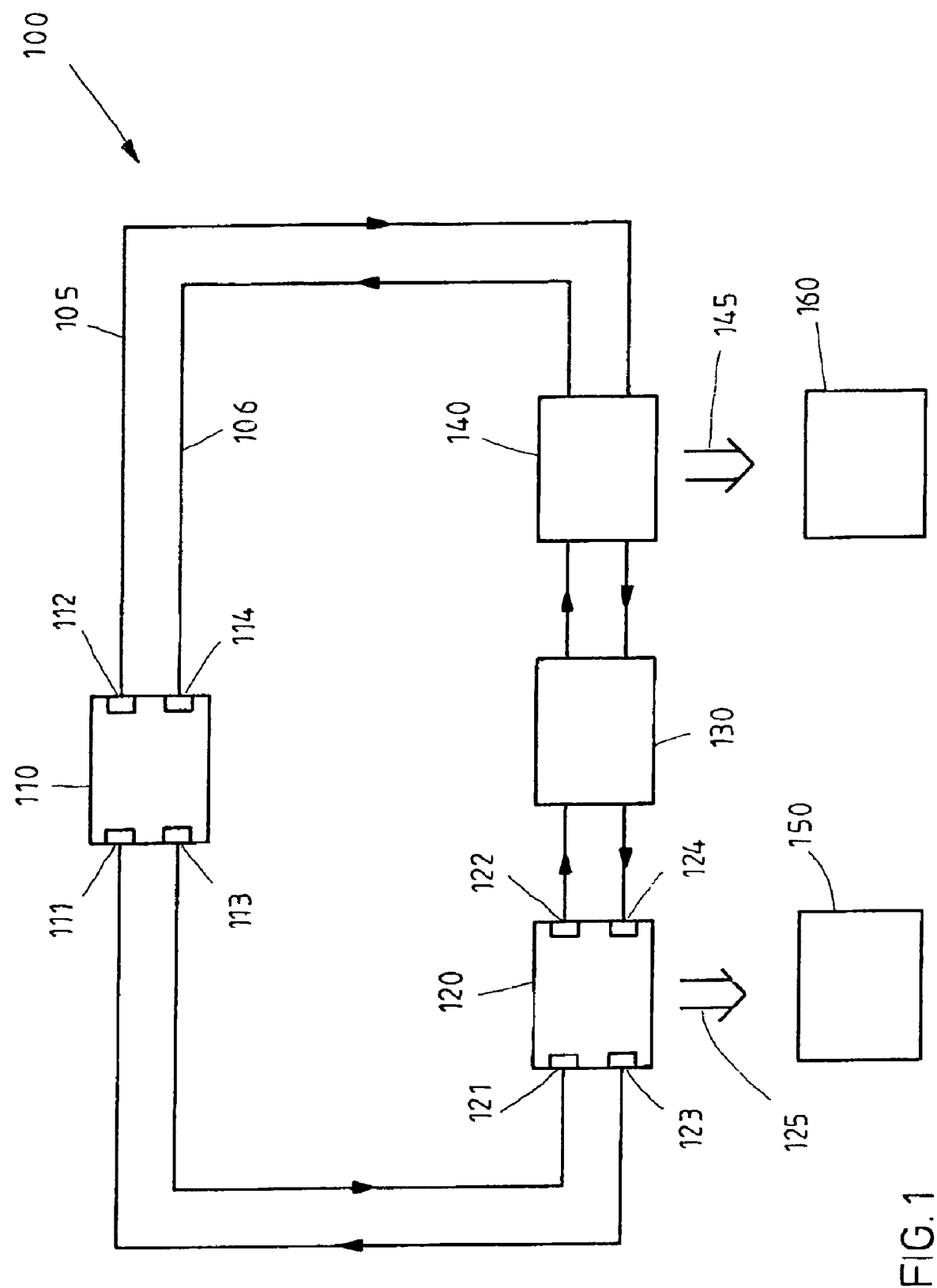
FIG. 1 shows a control system according to the exemplary embodiment and/or exemplary method of the present invention having a plurality of slave units using the example of a ring-shaped topology.

FIG. 1 schematically shows the design of the control system according to the exemplary embodiment and/or exemplary method of the present invention in a first embodiment. The control system shown here has a master unit 110 which is designed to control multiple slave units 120, 130 and 140. FIG. 1 shows three such slave units. The control system according to the present invention has at least two slave units, but it may also include a much larger number of slave units.

The slave units generate synchronization signals or control signals 125, 145 having high time precision to operate system components of a controlled system, indicated here schematically by reference numerals 150 and 160, on the basis of a common time base. If the controlled system is a printing machine, for example, then subunits 150 and 160 are typically printing stations having the corresponding drives and control units.

Master unit 110 and slave units 120, 130 and 140 are interconnected by two signal lines 105, 106 in the form of a ring. With regard to the signal direction, these signal lines pass through the slave units in opposite directions, each passing through exactly once.

Each slave unit receives data on a signal path 105, 106 and relays data not intended for itself to the next slave unit on this signal path. However, data addressed to the slave unit may also be relayed to the next slave unit in order to return to the master unit. The exemplary embodiment and/or exemplary method of the present invention is described below for a system in which data is exchanged in the form of addressed data packets, also known as data telegrams. However, the exemplary embodiment and/or exemplary method of the present invention may also be applied to other systems which implement communication, e.g., via simple relaying of data from one unit to the next.

In this embodiment and the following embodiments, it is assumed that the data telegrams are always relayed from the master unit or slave unit to the next unit in the same transit time. The transit time of a data telegram through the system as a whole, i.e., the period of time from transmission by master unit 110 until its return to master unit 110 on the same signal path is identically reproducible.

In the embodiment illustrated in FIG. 1, the master unit and each slave unit each have four terminals. Two terminals, one receiving terminal and one sending terminal, form a port via which the particular unit is connected to one of the communication lines.

The master unit includes a transmission terminal 112 and a reception terminal 111 (Tx/Rx) for transmitting data on signal line 105 to adjacent slave unit 140 and/or receiving data from opposed neighboring slave unit 120.

With regard to the second signal line 106, terminals 113 and 114 are provided for sending data to slave unit 120 and/or receiving data from slave unit 140. The terminals are shown as examples for slave unit 120. At terminal 121, a first port receives data from the master unit and at terminal 122 the port outputs data to next unit 130. A second port receives data at terminal 124 from slave unit 130 and at terminal 123 this port outputs data to the master unit.

To establish a common time base in the slave units for output of synchronization signals, the following procedure is implemented in the control system. First, master unit 110 determines the cycle time required by a signal to run through all slave units on one signal line. To do so, the master unit sends a data telegram on at least one of signal lines 105 and/or 106, the data being received by each slave unit and relayed to the next slave unit on the same signal line. In the return of the data telegram, master unit 110 determines time $t_{110-110}$ which elapses between sending and return [of the data telegram]. Signal throughput time $t_{110-110}$ ascertained by the master unit is reported to all slave units following the measurement.

Figure 3A:
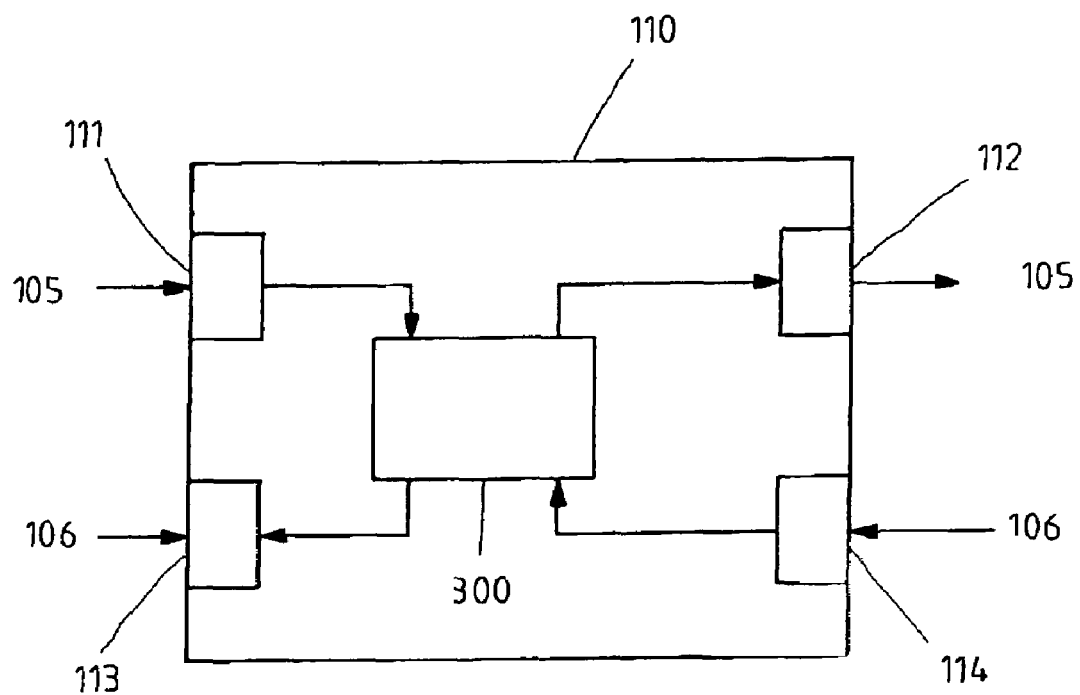
FIG. 3A shows a master unit suitable for controlling the control system depicted in FIG. 1.
Figure 3:
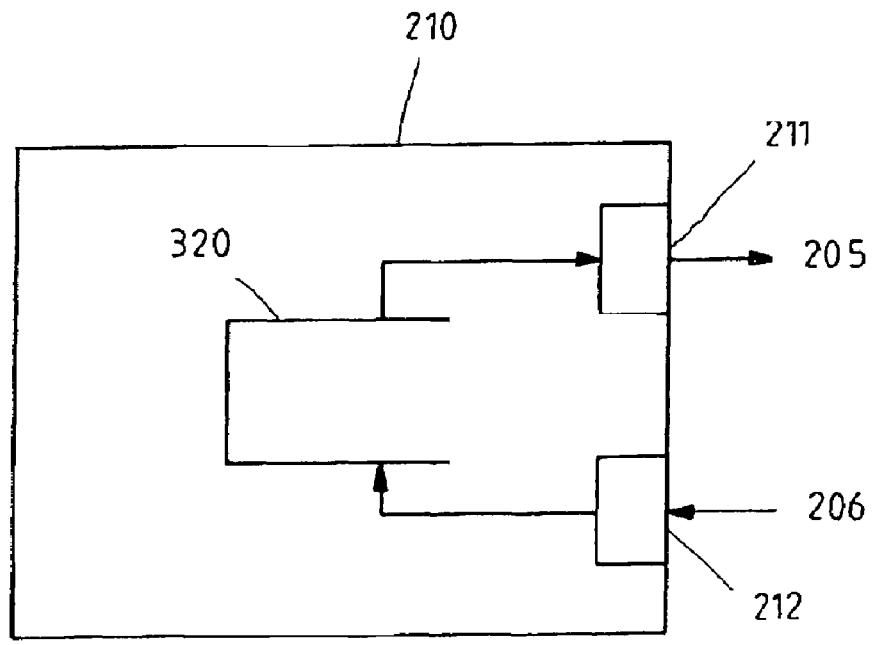
FIG. 3B shows a master unit suitable for controlling the control system depicted in FIG. 2.

FIG. 3A shows a schematic diagram of the master unit. An electronic control unit 300 is connected to each input and the slave units output 111, 112, 113 and 114 to receive, send and analyze data telegrams. In addition, the electronic control unit is capable of starting a time measurement in sending a data telegram and terminating and analyzing this measurement on reception of the data telegram at another terminal.

As described previously, the signal throughput time must be determined for at least one of signal lines 105 or 106. However, the master unit may also determine the signal throughput time for both signal paths. In the embodiment illustrated in FIG. 1, the two signal lines are laid out symmetrically, i.e., each signal line passes through the same number of slave units. Together with the condition mentioned above that the transmission of a telegram between adjacent units must always have the same transmission time, an identical signal transit time is obtained for throughput of a data telegram through all slave units on both signal lines. Therefore, as a rule it is sufficient to determine the signal throughput time for only one signal line 105 or 106.

In the case of an asymmetrical configuration of signal lines, however, it may be necessary to determine the signal throughput time for each signal line, to thereby draw conclusions regarding the system configuration. In addition, determining the throughput time of both signal lines makes it possible to detect errors in configuration and/or failure of a signal line.

After reporting the throughput time to all slave units, the master unit outputs a data telegram, which is received as a reference signal by all slave units and is relayed to the next slave unit or to the master unit. This data telegram may be output simultaneously by the master unit on both signal lines, i.e., at terminals 112 and 113. Alternatively, data telegrams (functioning as reference signals) may also be output on both signal lines with a known skew. On the basis of this reference signal, the slave units determine time correction parameters for establishing a common time base in generating synchronization signals.

On the basis of FIG. 4, where the design of a slave unit is outlined, ascertainment of time correction parameters for generating synchronization signals is to be explained in greater detail below.

Slave unit 120 depicted here is tied into signal lines 105 and 106 via two ports. The first port having reception terminal 121 and transmission terminal 122 establishes the connection for signal line 106. The second port having reception terminal 124 and transmission terminal 123 permits communication via signal line 105. According to the exemplary embodiment and/or exemplary method of the present invention, two time counters 420 and 430 are provided in slave unit 120, these time counters being started by reception of the reference signal on the particular signal line, i.e., via terminal 121 or 124. The time counters may be implemented as separate units within slave unit 120. However, the time counters may be implemented as a time counting function of an electronic control unit of the slave unit. These functional units of the slave unit, as well as those described below, may also be implemented as discrete components or, if necessary, also as software, which may be within an electronic control unit. In particular, it is also possible to use a time counter using which the electronic control unit measures the points in time of reception of the reference signals and determines the time that has elapsed since then.

An adder 440 continuously determines the counter contents of time counters 420 and 430 and forms the sum of the two counts. The sum is sent to a comparator 450 which continuously compares this sum of the two counts with the signal throughput time transmitted in advance by the master unit. As soon as the sum of the counts has reached or exceeded the value of the reported signal throughput times, the counter contents of time counters 420 and 430 are read out. On the basis of the read-out time counter contents, the slave unit determines time correction parameters for generating synchronization signals.

Each slave unit thus performs the steps described below. A signal throughput time transmitted by the master unit, corresponding at least to the signal throughput time through all slave units is received. On receipt of the reference signal over the first signal line, a first time count is started, and a second time count starts on reception of the reference signal over the second signal line. The two counts of the time counters are added up and compared with the signal throughput time reported by the master unit. The counter contents are read out as soon as the counter contents added up reach or exceed the reported signal throughput time.

In this way the slave units determine individual time correction parameters for generating synchronization signals in a very simple and efficient manner in a parallel process. These time correction parameters may be used in particular for taking into account the signal transit time of data telegrams and/or control signals from the master unit to the particular slave unit on signal lines 105 and 106.

The following calculation illustrates the interpretation of the read-out counter contents of the time counters and gives an example of the ascertainment of time correction parameters.

As already mentioned, the transmission time—and therefore the signal transit time—between two units is regarded as constant and reproducible. In addition it is assumed that the transmission time on the two signal lines is the same. Thus it is true that, e.g., for the link from the master unit to slave unit 120, the following equation holds for individual signal transmit times $\Delta t_{110\text{-}120(106)}$ and $\Delta t_{120\text{-}110(105)}$ on signal line 106 and/or 105:

$$\Delta t_{110\text{-}120(106)} = \Delta t_{120\text{-}110(105)} \qquad \text{Equation 1}$$

Therefore, signal throughput time $\Delta t_{110\text{-}110(105)}$ on signal line 105 corresponds to signal throughput time $\Delta t_{110\text{-}110(106)}$ on signal line 106 for the symmetrical topology illustrated in FIG. 1.

$$\Delta t_{110\text{-}110(105)} = \Delta t_{110\text{-}110(106)} \qquad \text{Equation 2}$$

Therefore for time $\Delta t_{110\text{-}120(105)}$ which is needed by a signal to travel from the master unit to slave unit 120 on signal line 105 and time $\Delta t_{110\text{-}120(106)}$ needed by a signal to travel from the master unit to slave unit 120 on signal line 106, it also holds that the sum of these times corresponds to the signal throughput time through all slave units:

$$\Delta t_{110\text{-}120(105)} + \Delta t_{110\text{-}120(106)} = \Delta t_{110\text{-}110(105)} \qquad \text{Equation 3}$$

If time counting begins on receipt of the reference signal over signal line 105 and another time counting begins on receipt of the reference signal over signal line 106 and if particular counter values $\Delta t_{z105}$ and $\Delta t_{z106}$ are read out as soon as the sum of the counter contents has reached the signal throughput time—e.g., $\Delta t_{110\text{-}110(105)}$—then the sum of the read-out counter contents is:

$$\Delta t_{z105} + \Delta t_{z106} = \Delta t_{110\text{-}110(105)} \qquad \text{Equation 4}$$

For each point in time after reception of the two reference signals in the slave unit, in particular for the time of read-out, it holds that $$\Delta t_{z105} + \Delta t_{110\text{-}120(105)} = \Delta t_{z106} + \Delta t_{110\text{-}120(106)} \qquad \text{Equation 5}$$

If reference signals are not sent by the master unit simultaneously on both signal lines, a skew is to be taken into account in equation 5.

After rearranging using equations 3 and 4, equation 5 then yields:

$$\Delta t_{z105} + \Delta t_{110\text{-}120(105)} = \Delta t_{110\text{-}110(105)} \qquad \text{Equation 6a}$$

$$\Delta t_{z106} + \Delta t_{110\text{-}120(106)} = \Delta t_{110\text{-}110(106)} \qquad \text{Equation 6b}$$

and $$\Delta t_{110\text{-}120(105)} = \Delta t_{z106} \qquad \text{Equation 7a}$$

$$\Delta t_{110\text{-}120(106)} = \Delta t_{z105} \qquad \text{Equation 7b}$$

The counter connected to signal line 106 thus determines the signal transit time for a signal transmitted from the master unit on signal line 105. Conversely, the counter connected to signal line 105 determines the time until arrival of a signal sent by the master unit on signal line 106.

To establish a common time base in all slave units, the read-out counter contents may be used as follows. A data telegram generated by the master unit is transmitted as the triggering signal to all slave units via one of the signal lines. Each slave unit waits a certain period of time after receiving the triggering signal. The waiting time after receipt of the triggering signal via a certain signal line corresponds to the read-out counter content of the counter connected to this signal line. Using the example of slave unit 120, the waiting time for signal line 105 is thus set at the time counter content of time counter 430 which has been read out. On the other hand, the waiting time for signal line 106 is set at the read-out counter content of time counter 420.

Equations 6a and 6b show that the point in time after receipt of the triggering signal and after the particular waiting time has elapsed is identical for all slave units. This is the case because for each slave unit the sum of the signal transit time until receipt of the triggering signal and the waiting time yield an identical total period of time (since the output of the triggering signal). In particular in the topology described here, the waiting time corresponds to a remaining signal transit time from the slave unit until its return to the master unit.

Thus, the time correction parameter for each signal line may be set at the read-out counter content in the slave unit, and the time correction parameter is used as the waiting time after receipt of a triggering signal. After the waiting time, each slave unit generates a synchronization signal which is thus output to the slave units at the same time. This permits a particularly simple determination of time correction parameters which permit output of synchronization signals in all slave units at the same time.

In addition, the time correction parameters thereby determined are available immediately after read-out of the counter contents in the slave units. In contrast with traditional methods, no computation operation is needed, nor is it necessary to transmit time parameters.

However, the exemplary embodiment and/or exemplary method of the present invention is not limited to simultaneous output of synchronization signals to different slave units. After receiving a data telegram sent by the master unit, comparable to a triggering signal, and after the corresponding waiting time, an identical point in time of a common time base is reached in all slave units, as describe above. This point in time may be used by the slave units as a reference point in time for coordination of control functions. For example, starting from this reference point in time, the slave units may output individual, chronologically offset synchronization signals or control signals with a high precision in time to control drives connected to the units.

In addition, it should be pointed out that the read-out point in time of the counter contents corresponds to an identical point in time of the common time base for all slave units. The read-out point in time may therefore be used directly as a reference point in time.

Figure 4:
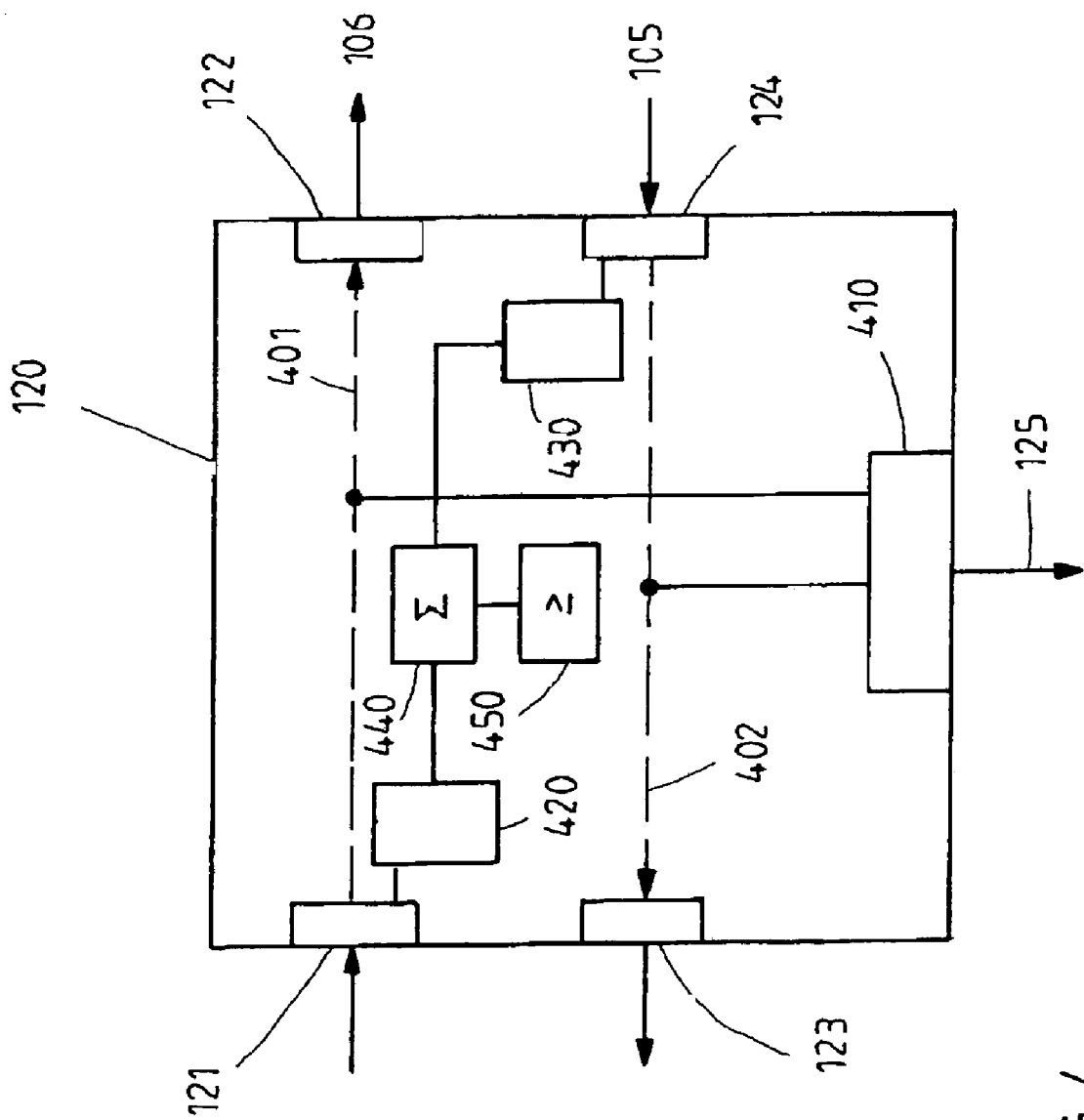
FIG. 4 shows a slave unit according to the exemplary embodiment and/or exemplary method of the present invention having terminals for two signal lines and two time counters assigned to the particular signal lines.

In FIG. 4 an electronic control unit inside slave unit 120 for chronologically controlled output of synchronization signals is labeled with numeral 410. However, such an electronic control unit may also be integrated with other counter, adder and comparator units 420, 430, 440, 450 in a shared controller. The function of synchronized output of synchronization signals may be implemented through software.

Slave unit 120 may include a memory in order to be able to store individual time correction parameters for each signal line. As described above, the read-out counter contents may be stored as time correction parameters. In an efficient and particularly simple embodiment, these stored time counter contents correspond[1] to a waiting time between reception of a data telegram from the master unit and a simultaneous point in time for all units. A simple synchronization among slave units is achieved in this way.

[1]TN: translated assuming that "entsprechend" is a typo for "entsprechen."

In the embodiment described so far, the master unit reports to the slave units the signal throughput time for throughput through all slave units. Alternatively, however, the master unit may also report to the slave units a time value as the signal throughput time which is greater than the ascertained signal throughput time. Again in this case the slave units determine an identical point in time of a common time base according to the procedure described above. Thus, for example, it is possible to incorporate additional slave units into the system subsequently and, if necessary, during operation. The reserve transit time needed for this may be taken into account by the master unit in advance.

Furthermore, by transmitting a greater signal throughput time, a known delay in signal processing in the slave units may be taken into account. This achieves the result that the reference point in time occurs in the particular slave unit only when processing capacity for a task to be executed at this point in time is available in this slave unit.

By specifying a higher signal throughput time it is possible to take into account asymmetrical signal transit times on the individual signal lines. In this case it is desirable for the identical point in time of the common time scale in the slave units to correspond to the point in time when the data telegram returns to the master unit on the "longer" signal line. The longer signal line is the signal line on which a data telegram passing through the slave units has a longer transit time. This ensures that it is possible to give a reference point in time for all slave units.

Figure 5B:
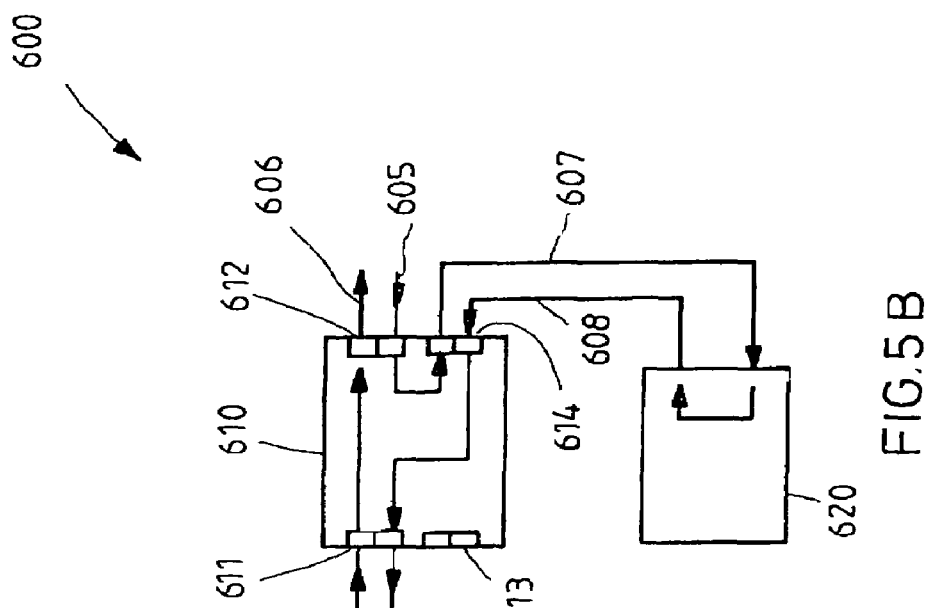
FIG. 5B shows a detail of a control system according to the exemplary embodiment and/or exemplary method of the present invention according to another embodiment in which two additional signal lines branch off in a linear pattern from one slave unit.

An asymmetry between the two ring-shaped signal lines may occur due to the incorporation of additional slave units in only one of the signal lines as illustrated in FIG. 5B, for example. In this case it may be necessary to report additional information with regard to the signal line configuration to certain slave units.

For example, it is possible to notify the slave units whether or not they will receive the data telegrams from the master unit with the additional delay causing the asymmetry on a signal line. The slave units not affected by the additional delay, i.e., slave units upstream from slave unit 610 on signal line 605 shown in FIG. 5B, may then correct their time counter contents values and/or time correction parameters to reach a reference point in time which is identical to that of the slave units affected by the delay. For example, the correction may be achieved by increasing the comparative value for the added time counter contents by the additional time delay amount in the slave units not affected by the additional delay.

Alternatively, any signal delay of a signal line may also be configured in one of the slave units to equalize the topologically induced asymmetry. In this case the method described in the first embodiment is applicable without any change.

In the exemplary embodiments described above, the master unit may additionally ascertain the physical sequence of slave units by ascertaining the counter contents read out from each slave unit.

A second embodiment of the present invention will now be described with reference to FIG. 2. This embodiment is very similar to the first embodiment described above. Therefore, mainly the features by which the following embodiment differs from the preceding embodiment will be described here.

Figure 2:
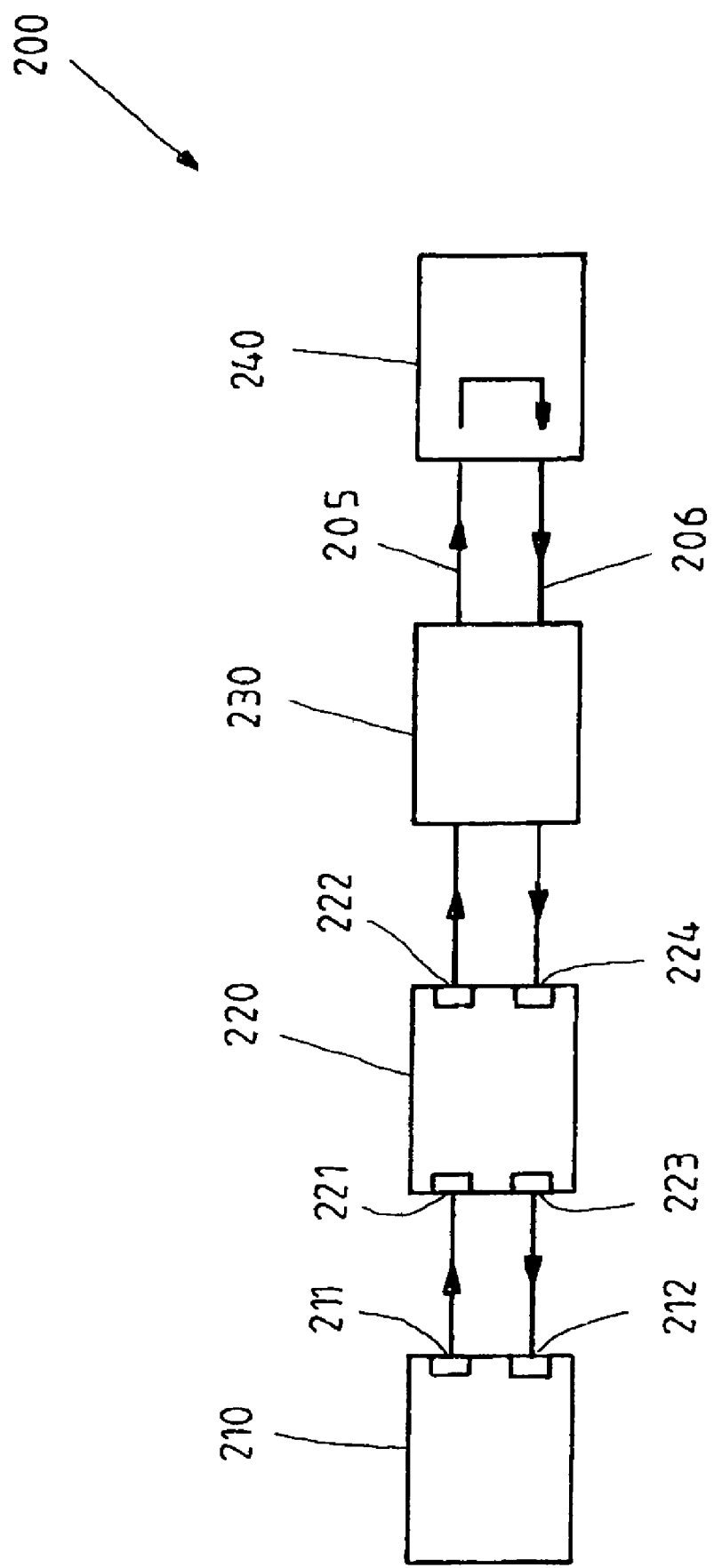
FIG. 2 shows a control system according to the exemplary embodiment and/or exemplary method of the present invention having a plurality of slave units using the example of a linear topology.

As FIG. 2 shows, in this embodiment of a control system, a master unit 210 and multiple slave units 220, 230 and 240 are provided, each of the slave units being connected to the master unit via two signal lines 205 and 206. According to the exemplary embodiment and/or exemplary method of the present invention, at least two slave units are provided. However, there is in principle no upper limit to the number of slave units. However, the signal lines are not connected to the master unit in the form of a ring-shaped as in the previous embodiment but instead run sequentially starting from the master unit through all slave units. The signals received on one signal line 205 in the last slave unit 240 from the standpoint of the master unit are transmitted to the other signal line 206 returning back to the master unit and pass through slave units 230 and 220 again.

Except for last slave unit 240, all slave units 220 and 230 have exactly the same design and configuration as slave unit 120 described in the previous embodiment. In particular, these slave units each have two ports. Each of these ports is connected to one of the signal lines. As shown in the example of slave unit 220, a first port has a reception terminal 221 and a transmission terminal 222 for the first signal line. A second port has a reception terminal 224 and transmission terminal 223 for the second signal line.

Master unit 210 in this embodiment differs from master unit 110 described previously in that this master unit is connected only to two terminals via corresponding signal lines. As shown in FIG. 3B, one port of master unit 210 is switched to send a signal from a terminal 211 to signal line 205 and to receive a signal from terminal 212 via signal line 206. An electronic control unit 320 receives and sends data telegrams via two terminals 211 and 212. The electronic control unit is also capable of determining the cycle time of a data telegram sent by terminal 211 and returned to terminal 212 after passing through all slave units. Master unit 210 reports the signal throughput time, which corresponds to a successive run through both signal lines 205 and 206, to all slave units 220, 230, 240.

Last slave unit 240 from the standpoint of master unit 210 is also connected to only one port via signal lines 205 and 206. In addition to the functionality of generating synchronization signals, this slave unit 240 has the function of relaying signals from signal line 205 to signal line 206.

In this embodiment, time correction parameters for synchronized output of synchronization signals are ascertained by a method which corresponds largely to the method described in the first embodiment. With the help of the time correction parameters, a certain point in time of a certain time base is specified in all slave units, as in the embodiment described previously. On the basis of such a reference point in time, slave units 220, 230 and 240 output synchronization signals for control of connected units.

The time correction parameters are ascertained, as stated previously, by a method very similar to that used in the embodiment described previously. First, master unit 210 sends a data telegram to one of signal lines 205 via its transmission terminal 211. The nature of this data telegram is such that it is relayed from each slave unit to the next slave unit on the signal line. On reaching last slave unit 240 on signal line 205 leading away from the master unit, the slave unit transmits the data telegram on signal line 206 which is returning to the master unit. The master unit measures signal throughput time $\Delta t_{210\text{-}210}$ required by the data telegram for successively passing through the two signal lines. All slave units except last unit 240 are run through once on each signal line.

Throughput time $t_{210\text{-}210}$ thus ascertained is reported to the slave units.

Master unit 210 then sends a data telegram on signal line 205, this telegram constituting a reference signal for the slave units and also successively passing through both signal paths. On receipt of the reference signal at a port, slave units 220, 230 start a time counter.

As described previously for slave unit 120, the slave units are equipped with two time counters each. Each time counter is assigned a port in such a manner that reception of the reference signal at this port starts the corresponding time counter. The design and functioning of the slave units in the linear configuration correspond to the design of the slave units illustrated in FIG. 4.

Consequently, each slave unit reads out the time counter when the added time counter contents reach or exceed the signal throughput time reported by the master unit. Thus, by analogy with the first embodiment, the following result is obtained for time counter contents $t_{z205}$, $t_{z206}$:

$$\Delta t_{210\text{-}210} = t_{z205} + t_{z206} \qquad \text{Equation 11}$$

Likewise, the following holds for the signal transit times of a signal sent by the master unit until reception by a slave unit via the particular signal lines 205 and/or 206, the times being referred to as $\Delta t_{220(206)}$, $\Delta t_{220(205)}$ for the example of slave unit 220:

$$\Delta t_{210\text{-}210} = \Delta t_{220(205)} + \Delta t_{220(206)} \qquad \text{Equation 12}$$

The preceding equation is also valid due to the directional symmetry in transmission of data telegrams between two slave units and the master unit.

On the basis of the time counting performed by the slave unit as of reception of the reference signal, as soon as a reference signal has been received at both ports, the following equation holds by analogy with equation 5:

$$\Delta t_{220(205)} + \Delta t_{z205} = \Delta t_{220(206)} + \Delta t_{z206} \qquad \text{Equation 13}$$

The time counter contents in slave unit 220 at the read-out point in time are obtained therefrom as follows:

$$\Delta t_{220(205)} + \Delta t_{z205} = \Delta t_{210\text{-}210} \qquad \text{Equation 14a}$$

$$\Delta t_{220(206)} + \Delta t_{z206} = \Delta t_{210\text{-}210} \qquad \text{Equation 14b}$$

and $$\Delta t_{220(205)} + \Delta t_{z206} \qquad \text{Equation 15a}$$

$$\Delta t_{220(206)} + \Delta t_{z205} \qquad \text{Equation 15b}$$

These equations may be defined accordingly for each slave unit of the control system shown in FIG. 2. They correspond to equations 6a, 6b and 7a, 7b for the first embodiment.

The signal transit times calculated in equation 15a, b may be used for ascertaining time correction parameters. However, the time counter contents thus ascertained may be used directly as time correction parameters.

As already described for the first embodiment, the counter contents may be used as waiting time to specify an identical point in time in a common time base in all slave units. In such a case, the master unit sends a triggering signal to all slave units on at least one of signal lines 205 or 206. The point in time after receiving the triggering signal on one signal line and after waiting a certain time delay indicates a point in time that is identical for all slave units if the waiting time corresponds to the time counter contents assigned to this signal line. This is apparent directly from equation 14a, b. As a rule, this time coincides with the return of the triggering signal in the master unit.

As described in the previous embodiment, the signal throughput time reported by the master unit may also include a time buffer in addition to the measured throughput time.

One exception in ascertaining the time correction parameters occurs for last slave unit 240 on signal line 205 leading away from master unit 210. In principle this slave unit may have exactly the same structure as slave units 220 and 230. However, this slave unit receives the reference signal at only one port, or more precisely, at only one terminal. Therefore, in performing the counting and comparison method described here, only one counter is started and the counter contents are read out as soon as this counter has reached the reported signal throughput time. The slave unit is able to draw conclusions regarding its position within the control system from this result and/or the fact that only one port is occupied. Alternatively the slave unit may be configured manually.

On the basis of this information, the slave unit sets suitable time correction parameters. Such time correction parameters may be equal to half of the signal throughput time reported by the master unit.

Additional embodiments of the present invention are described below on the basis of FIGS. 5A and 5B. These show in particular embodiments in which the slave units have more than two ports and consequently are connected to more than two signal lines.

Figure 5A:
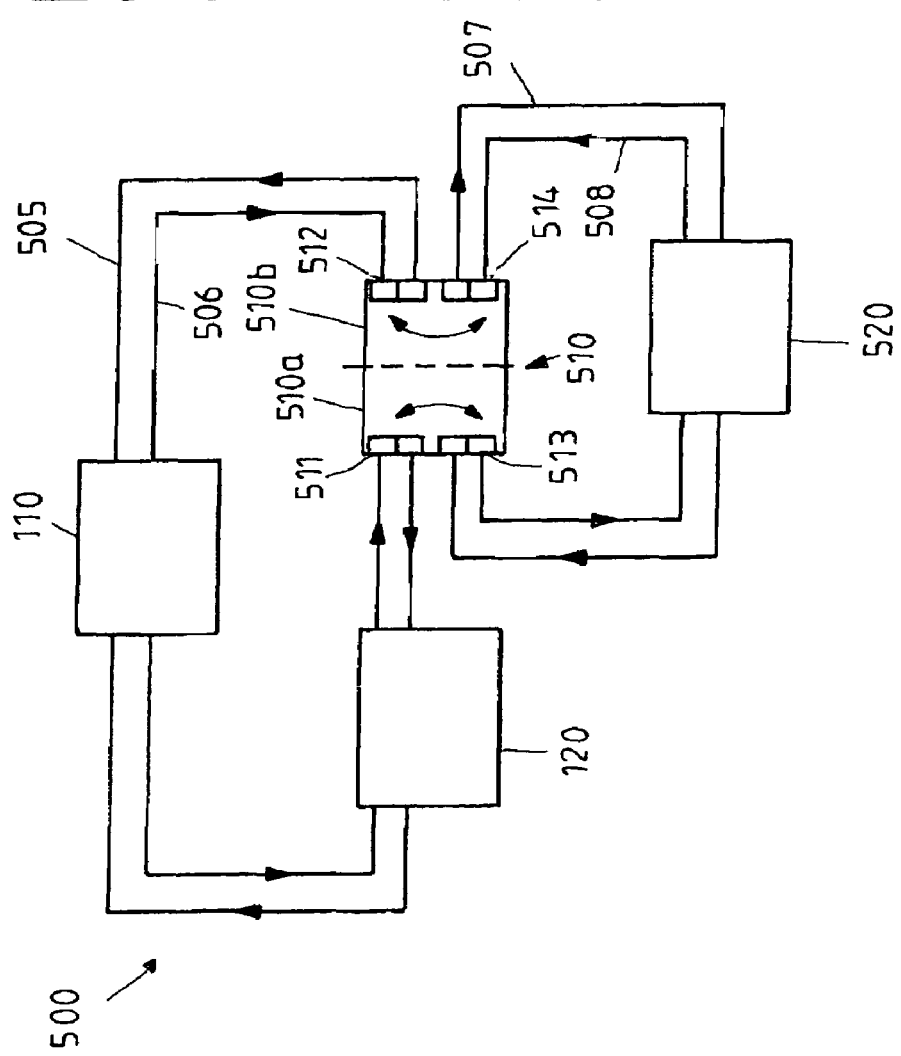
FIG. 5A shows another embodiment of a control system according to the exemplary embodiment and/or exemplary method of the present invention in which ring-shaped signal paths are situated in a cascade, one below the other.

The embodiment of a control system 500 shown in FIG. 5A has a master unit 110 which corresponds to the master unit described in the first embodiment. In addition, there are also slave units 120 and 510 which are connected to master unit 110 via two signal lines 505 and 506 in the form of rings.

Two additional ring-shaped signal lines 507 and 508 are connected to slave unit 510. These signal lines establish the connection to one or more additional slave units 520. This configuration of a control system therefore corresponds to a cascade of two ring-shaped subsystems. For signal lines 507 and 508, slave unit 520 appears as a submaster. Slave unit 520 has four ports 511, 512, 513 and 514, each with one reception terminal and one transmission terminal. The terminals are designed so that a signal relay is established between ports 512 and 514 and between ports 511 and 513. Signal line 507 is tied into signal line 505 by this signal relay and signal line 508 is tied into signal line 506.

For the ascertainment of time correction parameters for generating synchronized synchronization signals, slave unit 510 is treated like two independent partial slave units 510a and 510b, one partial slave unit 510a having two ports 511 and 513 and the other partial slave unit 510b having ports 512 and 514. Each partial slave unit has the design already described with reference to FIG. 4. Among other things, each partial slave unit 510a and 510b has two counters assigned to the individual signal lines. In this description, the configuration of this control system 500 is equivalent to the configuration of the control system described in the first embodiment. The determination of the time correction parameters is thus performed in the same way.

Instead of cascading two ring-shaped subsystems, a multiple cascade may also be used. In this case, each ring-shaped subsystem is tied into another subsystem. The subsystems may be positioned with a strict hierarchy among them, but a parallel connection of multiple subsystems to another subsystem via one or more four-port slave units is also possible. The use of slave units having more than four ports is also conceivable. As long as signal relaying and allocation of time counters is performed in such a manner that two continuous ring-shaped signal lines are formed from the signal lines of the subsystems, the ascertainment of the time correction parameters described above may be performed unchanged for all slave units and partial slave units, if necessary.

Control system 600 shown in a detail in FIG. 5B is constructed like control system 500 shown in FIG. 5A. This detail shows a slave unit 610 which is connected to two ring-shaped signal lines by two ports 611, 612. Two linear signal lines 607 and 608 are connected to another port 614. Multiple slave units may be provided on these signal lines. Last slave unit 620 on the signal line leading away from slave unit 610 transmits signals to signal line 608 leading back [to the master unit]. If another port 613 is present in slave unit 610, it remains unoccupied.

Signal relay rules are defined in slave unit 610. In the example shown here, these rules are as follows:

611→612, 612→614, 614→611

Signal lines 607 and 608 are thus inserted successively in signal line 605. Both signal lines 607 and 608 may be inserted into signal line 606 as an alternative or in addition by defining corresponding relay rules.

For this slave unit, as is the case for slave unit 510 according to the previous embodiment, two pairs of counters are provided. A first pair of counters monitors ports 611 and 612 with regard to the arrival of a reference signal. A second pair monitors ports 611 and 614. Alternatively, the second pair of counters may also monitor ports 612 and 614.

Using these pairs of counters, time correction parameters for synchronized generation of synchronization signals may be determined as described in the previous embodiments.

In summary, the exemplary embodiment and/or exemplary method of the present invention provides a synchronization method, a control system, and a slave unit for accomplishing synchronization of at least two slave units. The slave units and the master unit are connected by two signal lines. A signal sent by the master unit returns to the master unit after passing through all slave units. Two independent counters are provided in each slave unit, these counters being activated by reception of a reference signal sent by the master unit. The first time counter counts the time since receiving the reference signal over the first signal line and the second time counter counts the time since receiving the reference signal over the second signal line. The counter contents are read out as soon as the sum of the counter contents has reached a signal throughput time reported previously by the master unit.

In an advantageous manner, the exemplary embodiment and/or exemplary method of the present invention thus provides a simple and automatic arrangement to ascertain absolute measured time values, each of which is assigned to one signal line. This procedure for ascertaining individual measured time values assigned to the signal lines makes it possible for the first time to transfer measured time values as correction parameters of synchronization virtually automatically and directly.

What is claimed is:

1. A synchronization method for time synchronizing at least two slave units which are controlled by a master unit, and two signal lines each going through each slave unit exactly once in opposite order, the signal lines being configured so that a signal sent by the master unit passes through all of the slave units on at least one of the signal lines and returns to the master unit, the method comprising:
   determining a signal throughput time required by a signal transmitted by the master unit until it returns;

reporting the signal throughput time to all of the slave units;

transmitting at least one control signal by the master unit to all of the slave units as a reference signal so that each slave unit receives the at least one control signal via both signal lines, wherein each of the slave units performs the following:

starting a first time count upon reception of the at least one control signal via the first signal line, starting a second time count upon reception of the at least one control signal via the second signal line, adding the two time counter contents to provide a sum, comparing the sum of the time counter contents with the reported signal throughput time;

reading out the time counter contents when the time counter contents which have been added up correspond to a reported signal throughput time; and determining a time correction parameter for each of the slave units with respect to each signal line based on at least one read-out counter content, the slave units performing the time synchronization taking into account the time correction parameters.

2. The synchronization method of claim 1, wherein each of the slave units determines the time correction parameter with respect to each signal line.

3. The synchronization method of claim 1, wherein the master unit transmits to the slave units a control signal which serves as a triggering signal for generating synchronization signals.

4. The synchronization method of claim 3, wherein the time correction parameter assigned to one of the signal lines on the part of the slave unit corresponds to a waiting time and, upon reception of the triggering signal over this signal line, the slave unit outputs the synchronization signal after the waiting time has elapsed.

5. The synchronization method of claim 1, wherein the master unit transmits a control signal to the slave units, and after receiving the control signal on a signal line, the slave units wait for a period of time corresponding to the time correction parameter assigned to this signal line to indicate an identical point in time to all slave units.

6. The synchronization method of claim 1, wherein the two signal lines are configured so that the slave units are serially linked together starting from the master unit, and a last slave unit from the standpoint of the master unit transmits signals from the one signal line to the other signal line.

7. The synchronization method of claim 1, wherein the two signal lines each form two ring-shaped signal paths originating from the master unit and leading back to it.

8. The synchronization method of claim 7, wherein the master unit determines the signal throughput time for each of the ring-shaped signal paths.

9. The synchronization method of claim 7, wherein the master unit transmits one control signal on both signal paths simultaneously.

10. The synchronization method of claim 7, wherein the signal throughput time of the ring-shaped signal paths is the same for each signal path.

11. The synchronization method of claim 6, wherein the signal transit time from the master unit to the last slave unit on the one signal line corresponds to the signal transit time from the last slave unit to the master unit on the other signal line.

12. The synchronization method of claim 1, wherein the time correction parameter determined on the part of the slave unit for one signal line is a measure for the signal transit time from the master unit to this slave unit on the other signal line.

13. The synchronization method of claim 1, wherein the slave units save each read-out time counter content of the first time count as a time correction parameter for the first signal line and save the read-out time counter content of the second time count as a time correction parameter for the second signal line.

14. The synchronization method of claim 2, wherein the synchronization signals are output simultaneously with the return of the triggering signal to the master unit.

15. The synchronization method of claim 7, wherein the signal throughput times of the ring-shaped signal paths are different.

16. The synchronization method of claim 15, wherein the synchronization signals are output simultaneously with the return of the triggering signal which needs the longer signal throughput time for its return to the master unit.

17. The synchronization method of claim 1, wherein the master unit reports a signal throughput time which is greater than the ascertained signal throughput time.

18. The synchronization method of claim 17, wherein the reported signal throughput time corresponds to a signal throughput time obtained by the additional insertion of a preselected number of slave units into the signal paths.

19. The synchronization method of claim 1, wherein the adding of the time counter contents and the comparing of the added time counter contents with the reported signal throughput time are performed continuously.

20. A control system for time synchronizing at least two slave units, comprising:

a master unit for controlling the at least two slave units and having two signal lines each going through each slave unit exactly once in an opposite order, the signal lines being configured so that a signal transmitted by the master unit passes through all of the slave units on at least one of the signal lines and returns to the master unit, the master unit including:

a time measuring device for determining the signal throughput time needed by a signal transmitted by the master unit until it returns, and a communication device for reporting the signal throughput time to all of the slave units, the communication device transmitting at least one control signal from the master unit to all of the slave units as a reference signal, so that each of the slave units receives the at least one control signal via both signal lines;

wherein each of the slave units includes:

a first time counter to count a first time interval since receiving the at least one control signal via the first signal line, a second time counter to count a second time interval since receiving the at least one control signal via the second signal line, and a control unit having an adder for adding the two time counter contents and providing a sum thereof, a comparator for comparing the sum of the time counter contents with a reported signal throughput time, and a device for reading out the time counter contents when the sum of the time counter contents corresponds to the reported signal throughput time; and wherein a time correction parameter is determined for each of the slave units with respect to each of the signal lines based on at least one read-out time counter content, the slave units performing the time synchronization taking into account the time correction parameters.

21. The control system of claim 20, wherein the two signal lines are configured so that the slave units are linked together serially starting from the master unit, and a last slave unit from the standpoint of the master unit transmits signals from the one signal line to the other signal line.

22. The control system of claim 20, wherein the two signal lines each form two ring-shaped signal paths leading away from the master unit and returning to it.

23. A synchronizable slave unit of a control system, the slave unit being controlled by a master unit, and two signal lines going through the slave unit, the slave unit receiving a signal throughput time reported by the master unit and also receiving a reference signal via both signal lines, the reference signal being transmitted by the master unit to the slave unit in the form of at least one control signal, comprising:
  a first time counter to count a first time interval since receiving the reference signal via the first signal line;
  a second time counter to count a second time interval since receiving the reference signal via the second signal line; and
  a control unit having an adder to add the two time counter contents and to provide a sum thereof, a comparator to compare the sum of the time counter contents with the reported signal throughput time and having a device for reading out the time counter contents when the sum of the time counter contents corresponds to the reported signal throughput time, and a time correction parameter being determined with respect to each signal line for the slave unit based on at least one read-out time counter content;
  Wherein the slave unit performs the time synchronization taking into account the time correction parameters.

24. The slave unit of claim 23, wherein the slave unit has a memory for storing the read-out time counter content of the first time counter as a time correction parameter for the first signal line and for storing the read-out time counter content of the second time counter as a time correction parameter for the second signal line.

25. The slave unit of claim 23, wherein the adder continuously adds up the time counter contents, and the comparator continuously compares the sum of the time counter contents with the reported signal throughput time.

26. A synchronization method for time synchronizing at least two slave units which are controlled by a master unit, in which two signal lines go through each of the slave units exactly once in opposite order, the signal lines being configured so that a signal transmitted by the master unit on at least one of the signal lines passes through all of the slave units and returns to the master unit, the synchronization method comprising:
  determining a signal throughput time required by a signal transmitted by the master unit until it returns,
  reporting the signal throughput time to all of the slave units;
  transmitting at least one control signal from the master unit to all of the slave units as a reference signal so that each of the slave units receives the at least one control signal via both of the signal lines, each of the slave units performing the following:
    starting a first time count upon receiving the at least one control signal via the first signal line,
    starting a second time count upon receiving the at least one control signal via the second signal line,
    adding the two time counter contents to provide a sum thereof,
    comparing the sum of the time counter contents with the reported signal throughput time, and
    ascertaining a point in time when the sum of the time counter contents corresponds to a reported signal throughput time; and
  synchronizing the slave units based on the ascertained point in time.

* * * * *